United States Patent
Takahashi

(10) Patent No.: US 9,582,910 B2
(45) Date of Patent: Feb. 28, 2017

(54) DISPLAY-SCREEN-DATA EDITING APPARATUS

(75) Inventor: Misaki Takahashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 128 days.

(21) Appl. No.: 14/360,867

(22) PCT Filed: Dec. 28, 2011

(86) PCT No.: PCT/JP2011/080481
§ 371 (c)(1),
(2), (4) Date: May 27, 2014

(87) PCT Pub. No.: WO2013/099013
PCT Pub. Date: Jul. 4, 2013

(65) Prior Publication Data
US 2014/0333628 A1    Nov. 13, 2014

(51) Int. Cl.
*G06T 11/20* (2006.01)
*G09G 5/00* (2006.01)
*G09G 5/36* (2006.01)
*G05B 23/02* (2006.01)
*G06T 11/60* (2006.01)

(52) U.S. Cl.
CPC ........ *G06T 11/206* (2013.01); *G05B 23/0272* (2013.01); *G06T 11/60* (2013.01); *G09G 5/00* (2013.01); *G09G 5/36* (2013.01)

(58) Field of Classification Search
CPC ............... G07F 17/3227; G06F 3/0482; G06F 17/30867; G06F 3/04842; G06F 17/30575; G06F 17/30991; G06F 3/0236; G06F 3/0483; G06F 3/0608
See application file for complete search history.

(56) References Cited

U.S. PATENT DOCUMENTS

2007/0030286 A1    2/2007    Hirasaka
2010/0161085 A1    6/2010    Sumiya

FOREIGN PATENT DOCUMENTS

CN       100495399 C       6/2009
DE    112007003298 T5    11/2009
(Continued)

OTHER PUBLICATIONS

Taiwanese Office Action, mailed Mar. 27, 2014, Application No. 101104324.
(Continued)

*Primary Examiner* — Maurice L McDowell, Jr.
*Assistant Examiner* — Raffi Isanians
(74) *Attorney, Agent, or Firm* — Sughrue Mion, PLLC; Richard C. Turner

(57) ABSTRACT

A display-screen-data editing apparatus including: a storing unit that stores therein a variable table in which a device and a comment for the device are associated with each other; a table generating unit that generates a history table by analyzing screen data and furthermore generating a history-inclusive variable table by combining the variable table and the history table; and a search processing unit that performs a search process on a device and a comment in the history-inclusive variable table on a basis of a character string input to one of a device input field and a comment input field and displays extracted device or comment as a list, wherein a device or a comment that is selected from the displayed list is input to the device input field and the comment input field.

8 Claims, 6 Drawing Sheets

(56) References Cited

FOREIGN PATENT DOCUMENTS

| | | | |
|---|---|---|---|
| JP | 08-263111 A | 10/1996 |
| JP | 11-039010 A | 2/1999 |
| JP | 11-327616 A | 11/1999 |
| JP | 11-338903 A | 12/1999 |
| JP | 2000-029506 A | 1/2000 |
| JP | 2005-352612 A | 12/2005 |
| JP | 2007-299205 A | 11/2007 |
| JP | 2008-077467 A | 4/2008 |
| JP | 2008-191900 A | 8/2008 |
| JP | 2008-197721 A | 8/2008 |
| TW | 201118609 A | 6/2011 |
| WO | 2008135585 A1 | 11/2008 |

OTHER PUBLICATIONS

International Search Report for PCT/JP2011/080481 dated Apr. 10, 2012.
Communication dated Jul. 26, 2016, from the German Patent Office in counterpart German application No. 11 2011 106 051.3.

FIG.3

| DEVICE | COMMENT |
|---|---|
| M0 | LINE 1 START |
| M1 | LINE 2 START |
| M2 | LINE 3 START |
| D1 | MOTOR A SPEED |
| D2 | MOTOR B SPEED |
| D3 | MOTOR C SPEED |
| D4 | MOTOR D SPEED |
| GB001 | INTERNAL SWITCH 1 |
| GB002 | INTERNAL SWITCH 2 |
|  |  |

| DEVICE | COMMENT | HISTORY INFORMATION | | |
|---|---|---|---|---|
| | | CLASSIFICATION 1 | CLASSIFICATION 2 | CLASSIFICATION 3 |
| M0 | LINE 1 START | B-1 | BIT SWITCH | MONITOR DEVICE |
| GB100 |  | B-2 | BIT LAMP | MONITOR DEVICE |
| D10 | MOTOR G SPEED | W-5 | NUMERICAL DISPLAY | MONITOR DEVICE |
| GD200 |  | B-5 | LINE GRAPH | LOWER LIMIT DEVICE |
|  | LINE 4 START | B-1 | BIT SWITCH | CHARACTER STRING |
|  | LINE 4 START | B-1 | BIT SWITCH | NAME |
| GD100 |  | COMMON SETTING | ENVIRONMENTAL SETTING | LANGUAGE SWITCHING DEVICE |
| GB100 |  | B-2 | BIT LAMP | MONITOR DEVICE |
|  |  |  |  |  |

| DEVICE | COMMENT | HISTORY INFORMATION | | |
|---|---|---|---|---|
| | | CLASSIFICATION 1 | CLASSIFICATION 2 | CLASSIFICATION 3 |
| M0 | LINE 1 START | B-1 | BIT SWITCH | MONITOR DEVICE |
| M1 | LINE 2 START | | | |
| M2 | LINE 3 START | | | |
| D1 | MOTOR A SPEED | | | |
| D2 | MOTOR B SPEED | | | |
| D3 | MOTOR C SPEED | | | |
| D4 | MOTOR D SPEED | | | |
| D10 | MOTOR G SPEED | W-5 | NUMERICAL DISPLAY | MONITOR DEVICE |
| GB001 | INTERNAL SWITCH 1 | | | |
| GB002 | INTERNAL SWITCH 2 | | | |
| GB100 | | B-2 | BIT LAMP | MONITOR DEVICE |
| GD100 | | COMMON SETTING | ENVIRONMENTAL SETTING | LANGUAGE SWITCHING DEVICE |
| GD200 | | B-5 | LINE GRAPH | LOWER LIMIT DEVICE |
| | LINE 4 START | B-1 | BIT SWITCH | CHARACTER STRING |
| | LINE 4 START | B-1 | BIT SWITCH | NAME |
| | | | | |

DISPLAY-SCREEN-DATA EDITING APPARATUS

CROSS REFERENCE TO RELATED APPLICATIONS

This application is a National Stage of International Application No. PCT/JP2011/080481 filed Dec. 28, 2011, the contents of all of which are incorporated herein by reference in their entirety.

FIELD

The present invention relates to a display-screen-data editing apparatus that generates screen data for operating and monitoring a programmable display and apparatuses connected thereto.

BACKGROUND

When screen data for a display is generated by a display-screen-data editing apparatus, it is required to set up memory addresses (hereinafter, devices) for a programmable display (hereinafter, a display) and apparatuses connected thereto, and there is a method of setting up annotation strings (hereinafter, comments) for the memory addresses.

In the case where screen data for a display is generated, when devices of the display and the apparatuses connected thereto are input, the comments set for the devices are referred to; therefore, the devices can be input correctly (for example, see, Patent Literature 1).

Moreover, there is a method of selecting a device or a comment from the narrowed-down number of candidates by searching for and displaying the devices or comments. With this method, it becomes possible to reduce input errors and increase the input speed by narrowing down the number of candidates to be selected from (for example, see, Patent Literature 2).

As described above, the drawing efficiency is improved by making it possible to recognize the roles of devices by referring to comments that are preassigned by drawing software or other tools when the devices are input.

CITATION LIST

Patent Literature

Patent Literature 1: Japanese Patent Application Laid-open No. 2008-197721
Patent Literature 2: Japanese Patent Application Laid-open No. 2005-352612

SUMMARY

Technical Problem

In the operation of generating screen data for a display, one of the essential operations is to input devices and comments explaining the devices. In conventional technologies, only the combinations of a device and a comment prepared in advance can be referred to. However, in a case where a device with no comment assigned thereto is used, it is necessary to set up a comment each time or separately prepare a memorandum or the like.

Moreover, when a large number of devices are used, it is in some cases difficult to recognize where and how these devices are used only with the preset comments.

Furthermore, there are many cases where it is impossible to flexibly respond to the current displays, which are required to provide more complicated topologies, with the existing technologies.

The present invention has been achieved in view of the above and an object of the present invention is to obtain a display-screen-data editing apparatus capable of responding to a case where it is impossible to respond only with the comments prepared in advance by increasing the information on devices or comments without adding new information from a user.

Solution to Problem

In order to solve the above problems and achieve the object, the present invention is a display-screen-data editing apparatus that generates screen data for a programmable display, including: a storing unit that stores therein a variable table in which a device and a comment for the device are associated with each other; a table generating unit that generates a history table that includes a plurality of items, in each of which the device used in the screen data, a comment for the device, and history information that indicates a usage condition of the device are associated with each other, by analyzing the screen data, and furthermore generating a history-inclusive variable table by combining the variable table and the history table; and a search processing unit that performs a search process on an item in the history-inclusive variable table on a basis of a character string input to one of a device input field and a comment input field and displays an extracted item as a first list, wherein a device or a comment that is included in an item selected from the first list is input to the device input field and the comment input field.

Advantageous Effects of Invention

The display-screen-data editing apparatus according to the present invention has an effect in that devices and comments can be input easily when a sequence program is generated.

BRIEF DESCRIPTION OF DRAWINGS

FIG. 3 is a diagram illustrating one example of a variable table.

FIG. 4 is a diagram illustrating one example of a history table.

FIG. 5 is a diagram illustrating one example of a history-inclusive variable table.

DESCRIPTION OF EMBODIMENTS

Exemplary embodiments of a display-screen-data editing apparatus according to the present invention will be explained below in detail with reference to the drawings. This invention is not limited to the embodiments.

Embodiment

Figure 1:
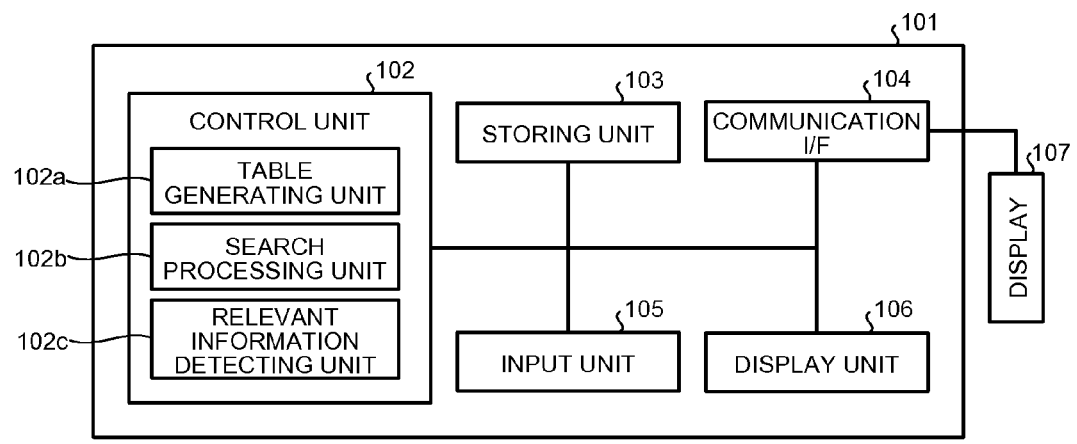
FIG. 1 is a diagram illustrating the configuration of an embodiment of a display-screen-data editing apparatus according to the present invention.

FIG. 1 is a diagram illustrating the configuration of an embodiment of a display-screen-data editing apparatus according to the present invention. A display-screen-data editing apparatus 101 includes a control unit 102 that performs various controls, an input unit 105 that receives inputs from an input device, such as a keyboard and a pointing device, a display unit 106 that is a display device that outputs predetermined information, a storing unit 103 that is a storage device (for example, RAM), and a communication interface (I/F) 104, and is connected to a display 107 via a predetermined cable, network, or the like, via the communication I/F 104.

The control unit 102 is, for example, a CPU. The control unit 102 executes drawing software with the storing unit 103 being used as a work area, whereby a table generating unit 102a that generates history information with respect to a device-comment, a search processing unit 102b that searches a variable table and a history table stored in the storing unit 103 for information to be displayed, and a relevant information detecting unit 102c that provides information relevant to predetermined input information are formed in the control unit 102.

The screen data generated by the display-screen-data editing apparatus 101 is transmitted to the display 107 via the communication I/F 104.

Figure 2:
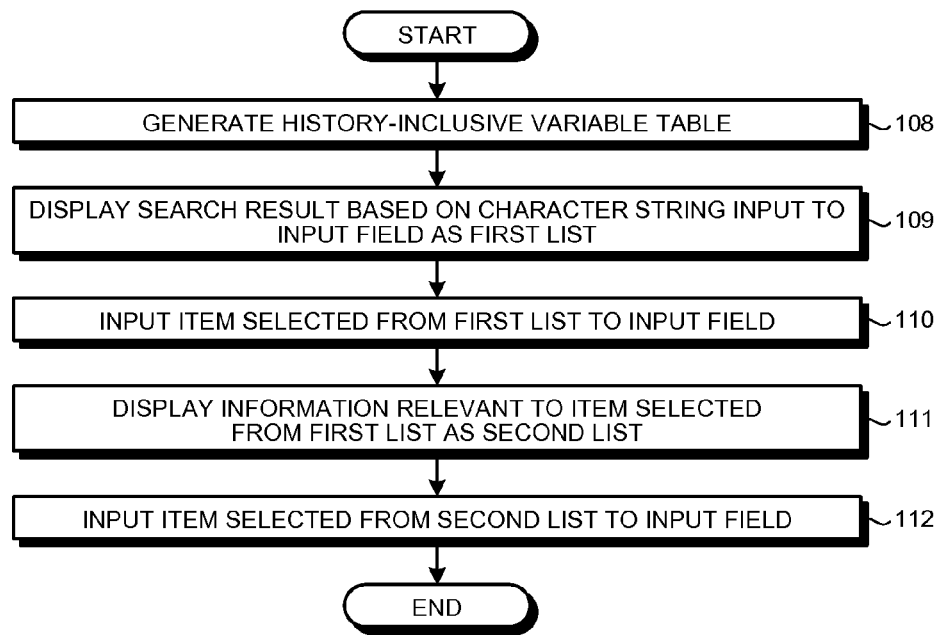
FIG. 2 is a diagram illustrating the flow of the operation of the display-screen-data editing apparatus according to the embodiment.

FIG. 2 is a diagram illustrating the flow of the operation of the display-screen-data editing apparatus according to the embodiment. The operation of the display-screen-data editing apparatus 101 includes a process (Step S108) of generating a history-inclusive variable table on the basis of the variable table and the history table, a process (Step S109) of performing a search process on the basis of the character string input to the device input field or the comment input field and displaying items extracted from the history-inclusive variable table as a first list, a process (Step S110) of inputting a device, a comment, or history information selected from the first list to the input field, a process (Step S111) of extracting items relevant to the selected item from the history-inclusive variable table and displaying them as a second list, and a process (Step S112) of inputting the item selected from the second list to the input field.

First, the process (S108) of generating the history-inclusive variable table on the basis of the variable table and the history table will be explained. In the screen data for a display to be generated in the display-screen-data editing apparatus 101, comments are assigned to devices in many cases in order to clarify their intended use and the information thereon is stored in the storing unit 103 for each screen data as a variable table 201. FIG. 3 is a diagram illustrating one example of the variable table 201. The variable table 201 includes a plurality of items, each of which is a pair of a device and a comment.

The table generating unit 102a generates a history table 202 that is data in the form of a table, in which devices used in the screen data, comments, and history information are associated with each other, by extracting the devices that are used from all the screen data, and stores the history table 202 in the storing unit 103. FIG. 4 is a diagram illustrating one example of the history table 202. The history table 202 includes a plurality of items, each of which includes at least one of a device and a comment and history information. In FIG. 4, in the history table 202, "No." is assigned to a classification 1 of the history information, "part type" is assigned to a classification 2 of the history information, and "setting item of device" is assigned to a classification 3 of the history information; however, it is not limited thereto and can be changed depending on the setting made by the user.

The table generating unit 102a generates a history-inclusive variable table 203, in which at least one of a device and a comment is a primary key, on the basis of the variable table 201 and the history table 202 and stores it in the storing unit 103 as a database. FIG. 5 is a diagram illustrating one example of the history-inclusive variable table 203. The history-inclusive variable table 203 includes a plurality of items, each of which includes at least two of a device, a comment, and history information.

The variable table 201 is such that a device and a comment are paired; therefore, when the history is added, the variable table 201 becomes data that always includes both a device and a comment; however, because a combination different from those in the variable table 201 may be present in the history table 202, the history-inclusive variable table 203 is generated such that all the combinations of a device and a comment (which include a case where one of a device and a comment is not present) are included in such a way that the user can recognize that effect.

Specifically, the data of the history-inclusive variable table 203 is generated by inserting the combinations of a device and a comment, which are not present in the history table 202 among the combinations of a device and a comment in the variable table 201, into the history table 202 with the history of these items being left blank.

Next, the searching and displaying method of data (S109) will be explained. Every time one character is input to the device•comment field by an input operation by the user, the input unit 105 receives the input. The search processing unit 102b searches the history-inclusive variable table 203 generated by the method described above for the character strings starting from the first character as search keywords. In this embodiment, only a device and a comment are searched for and a character string in the history data is not searched for; however, as will be described later, a character string in the history data can be searched for.

Figure 6:
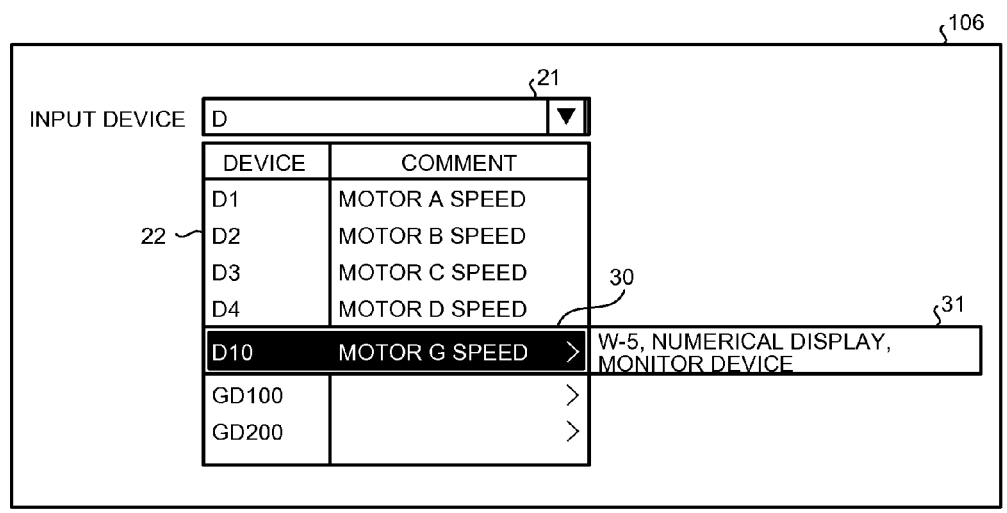
FIG. 6 is a diagram illustrating a state where devices that partially match the character string input to a device input field is displayed as a first list.

The rows of data that includes a device or a comment that partially matches the character string input to the input field are extracted from the database in the storing unit 103 and are displayed on the display unit 106 as a first list. When character string information is input by using the input unit 105, the list of the candidates matching it is displayed on the display unit 106; however, in this case, not all the list items may have history information. Therefore, information is displayed only for the list items having history information. Then, history information is automatically displayed on the side of a device•comment over which the cursor is placed. FIG. 6 is a diagram illustrating a state where the devices that partially match the character string input to the device input field is displayed. In FIG. 6, "D" is input to a device input field 21; therefore, devices partially matching the character string "D" are displayed on the display unit 106 as a first list 22. A cursor 30 is placed over the item of a device D10; therefore, history information 31 is displayed on the side of the item of the device D10.

Typically, items having only information that does not correspond to the input field are not targeted for being displayed in a list; however, in the input field for a comment or a character string, a character string of history data may be used for inputting a character string as a comment, which will be explained later. Therefore, although data on the list items that do not have device information is not displayed in the device input field, the list items that do not have comment information are also displayed when a comment or a character string is input.

History information is automatically displayed as a reference in parallel with and on the side of a device•comment over which the cursor is placed. A device or a comment can be easily selected by referring to the attached history data, thereby improving the drawing efficiency.

Figure 7:
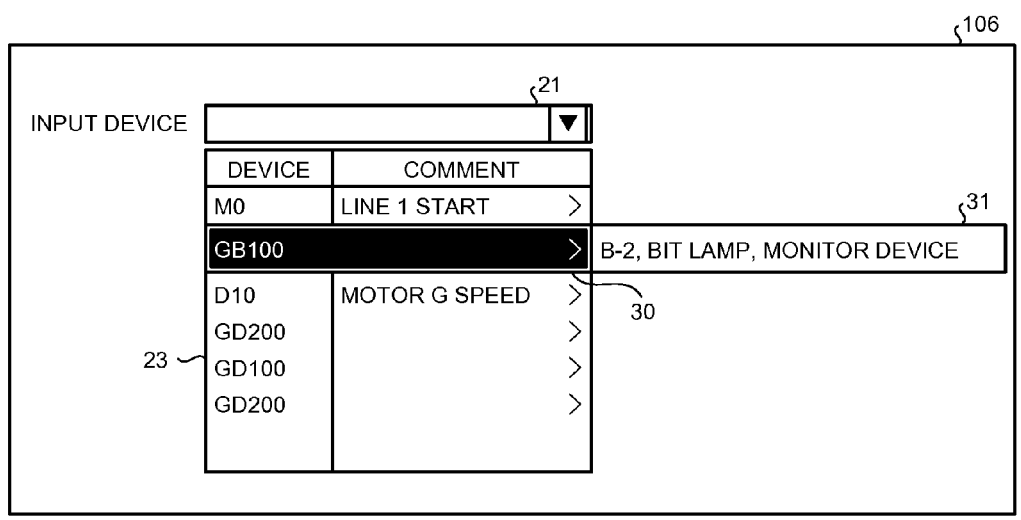
FIG. 7 is a diagram illustrating a state where history information is displayed on the side of a device•comment over which the cursor is placed on the first list.

When no character string is input to the input field displayed on the display unit 106, the search processing unit 102b displays devices•comments in the items in the history table 202 in order of the most recently used one appearing first as a first list on the basis of the history table 202 recorded in the storing unit 103. Then, history information is automatically displayed on the side of a device•comment over which the cursor is placed. FIG. 7 is a diagram illustrating a state where history information is displayed on the side of a device•comment over which the cursor is placed on the first list. In FIG. 7, a character string is not input to the device input field 21; therefore, a first list 23 on the basis of the history table 202 is displayed on the display unit 106. The cursor 30 is placed over the item of a device GB100; therefore, the history information 31 is displayed on the side of the item of the device GB100.

Next, the process (Step S110) of inputting a device, a comment, or history information selected from the list to the input field will be explained. The user can input a character string to the input field by selecting data desired to be input from the displayed list by the input unit 105. At this point, if the input field displayed on the display unit 106 is for inputting a device, the device in the selected data is input and, if the input field is for inputting a comment or a character string, a comment is input.

Figure 8:
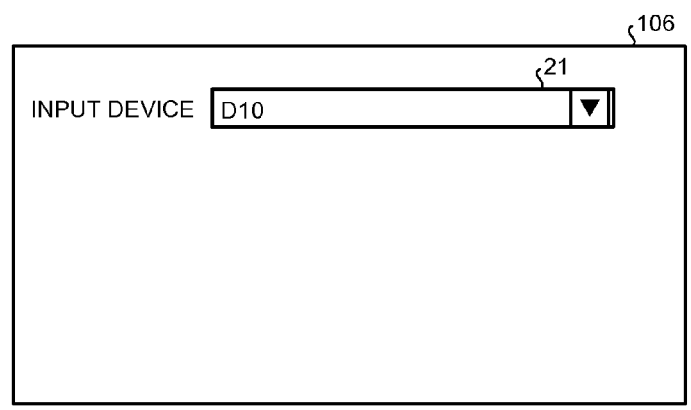
FIG. 8 is a diagram illustrating a state where a character string is input to an input field by selecting data desired to be input from the displayed list by an input unit.

FIG. 8 is a diagram illustrating a state where a character string is input to the input field by selecting data desired to be input from the displayed list by the input unit 105. The input unit 105 receives a predetermined operation (for example, pressing the enter key) in a state where the cursor 30 illustrated in FIG. 6 is placed over the device D10, whereby a character string "D10" is input to the device input field 21 displayed on the display unit 106.

Moreover, a character string can be input to the comment input field by using history information instead of a comment. When a character string is input to the comment input field also, the list of input candidates is displayed on the display unit 106 by using the history-inclusive variable table 203. In this embodiment, an explanation will be given of an operation of using history information to be input to the comment input field as a character string without using a pre-registered comment.

The process in Step S108 is similar to the above. With regard to each device registered in the history-inclusive variable table 203, even if a comment is not registered, a history is attached; therefore, when the input unit 105 receives an input of a character string to the comment input field in the process in Step S109, even if a device does not have a comment, the search processing unit 102b displays it as a candidate as long as history information thereon partially matches the input character string.

Figure 9:
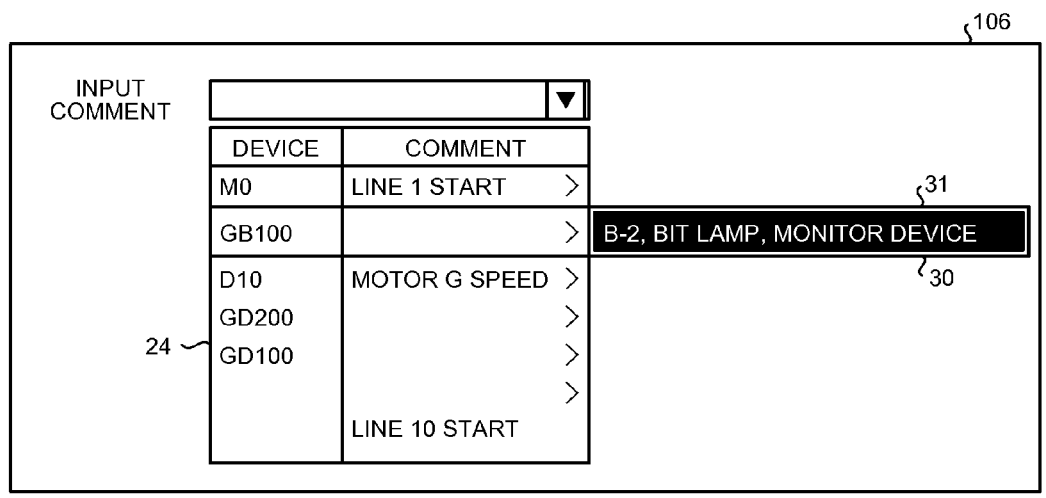
FIG. 9 is a diagram illustrating a state where the cursor is moved to history information.

Then, when a history is input as a character string to the comment input field in the process in Step S110, the input unit 105 receives a predetermined operation (for example, pressing the right cursor key) performed in a state where the cursor is placed over the item having history information, whereby the cursor moves to the history information. FIG. 9 is a diagram illustrating a state where the cursor is moved to history information. The cursor 30 moves to the history information 31 by performing a predetermined operation in a state where the cursor 30 is placed over the device GB100 in a first list 24.

Figures 10, 11:
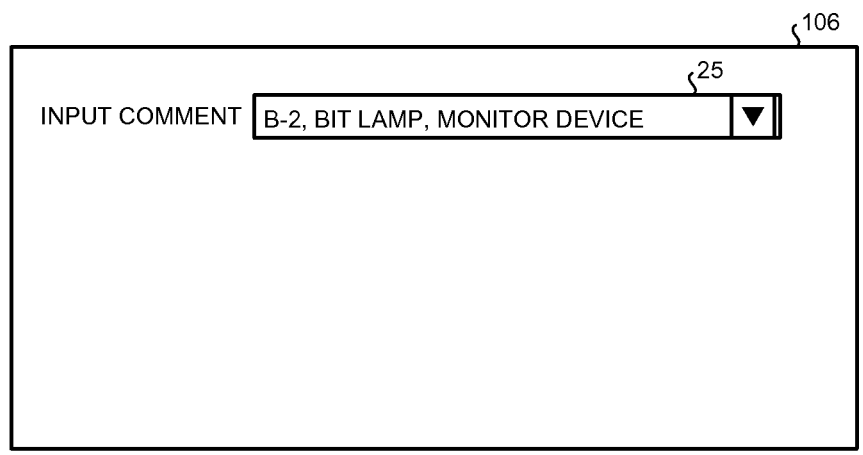
FIG. 10 is a diagram illustrating a state where a comment is input to a comment input field by performing a predetermined operation in a state where the cursor is placed over history information.
FIG. 11 is a diagram illustrating a state where information relevant to the character string input to the device input field is displayed as a second list.

Then, the input unit 105 receives a predetermined operation (for example, pressing the enter key) performed in a state where the cursor is placed over the history information, whereby the comment is input to the comment input field. FIG. 10 is a diagram illustrating a state where a comment is input to the comment input field by performing a predetermined operation in a state where the cursor is placed over history information. A predetermined operation is performed in a state where the cursor 30 is placed over the history information 31 of the device GB100 in the first list 24 as illustrated in FIG. 9, whereby a character string "B-2, bit lamp, monitor device", which is the history information on the device GB100, is input to a comment input field 25 displayed on the display unit 106. When a plurality of pieces of history information is present, history information can be selected by performing a different predetermined operation (for example, pressing up and down cursor keys).

Furthermore, when history information is selected and input, the classification to be input is narrowed down in advance without inputting the whole displayed information, whereby when performing an input, unnecessary character strings are excluded; therefore, the versatility of an input of a character string can be improved.

Next, an explanation will be given of a process of extracting items relevant to the selected item from the history-inclusive variable table 203 and displaying them as a second list 26, i.e., the process (Step S111) of displaying a list of the input candidates relevant to the input character string.

Typically, the display is connected to a machine for which serial numbers are input (a machine having a plurality of outputs) or a plurality of apparatuses; therefore, when a device is input, even if the device is the same type, the apparatus is different in many cases. For example, even if the first character of the device name is the same, there are many devices for which the number subsequent to the first character is different. In order to assist in an input in such cases, after a device or a comment in the history-inclusive variable table 203 that perfectly matches the character string input to the device or comment input field is selected and the selected item is once input to the input field, the relevant information detecting unit 102c displays a list of devices before and after the device or the device having the comment and the same devices of the connected apparatuses on the display unit 106 as input candidates.

When the character string that is input or is selected from the candidates by the input unit 105 perfectly matches a device or a comment stored in the history-inclusive variable table 203 of the storing unit 103, the relevant information detecting unit 102c searches for the items including devices•comments relevant to this character string and displays the search result on the display unit 106, whereby it is possible to provide the relevant information to the user and assist in increment operations.

FIG. 11 is a diagram illustrating a state where information relevant to the character string input to the device input field is displayed as a second list. For example, as illustrated in FIG. 6, in a state where the list 22 of the devices partially matching the character string "D" is displayed by inputting "D" to the device input field 21, if the item of D10 is selected from the list 22, the character string "D10" is input to the device input field 21. The relevant information detecting unit 102c searches for devices•comments that are relevant to the device D10 that perfectly matches the character string "D10" input to the device input field 21 and displays the searched result on the display unit 106 as the second list 26. In this embodiment, devices D9 and D11 having numbers before and after the device D10 and information relevant to D10 with different settings are displayed on the second list 26.

Next, a process (Step S112) of inputting an item selected from the list (second list) of the information relevant to the character string input to the device input field to the input field will be explained.

The input unit 105 receives an operation of selecting a device or a comment from the items in the second list displayed as a list of the information relevant to the character string input to the device input field, whereby the selected device or comment is input to the input field displayed on the display unit 106. Accordingly, it is possible to omit time and effort for inputting serial numbers or inputting information for distinguishing from other apparatuses. Moreover, because only the information on the connected apparatuses is displayed, it is possible to reduce the possibility of erroneous input at the time of setting. This operation is performed regardless of the presence or absence of a comment•history information in the device input field.

As described above, according to the present embodiment, before a device or a comment is searched for by using an input character string and a list is displayed, history information for recognizing the usage conditions is added other than a comment that is prepared in advance; therefore, explanation and additional information of devices to which comments are not set can be enhanced. Moreover, history information is assigned as a comment; therefore, the user can use the history information as a mark for the subsequent editing. Moreover, by separately displaying candidates of devices of a plurality of apparatuses and the like, flexible presentation and assignment of information can be realized.

Moreover, because history information is added to the list of devices and comments that partially match the character string input by the user when a device or a comment is input, the user can recognize where and how the devices are used in the screen data.

Moreover, because history information can be input to the comment input field instead of a comment, the content of history information of devices for which comments are not registered can be assigned as a comment.

Moreover, because the search process is performed every time a character is input to the input field, a larger number of devices and comments can be presented to the user. Accordingly, it is possible to find an input candidate early and prevent the occurrence of search omissions.

Furthermore, when a character string that perfectly matches a device or a comment registered in the history-inclusive variable table is input, devices and comments relevant to the character string are displayed, whereby it is possible to provide the relevant information to the user and assist in increment operations.

Due to the addition of information on devices, improvement of searchability, and provision of the relevant information, the number of pieces of information given to the user and the opportunities to present information to the user are increased, whereby a device and a comment can be easily input when generating screen data for a display that is becoming complicated due to an increase in functions.

INDUSTRIAL APPLICABILITY

As described above, the display-screen-data editing apparatus according to the present invention is useful in that a device and a comment can be easily input when a sequence program is generated and is particularly suitable for generating screen data for a display that is becoming complicated due to an increase in functions.

REFERENCE SIGNS LIST 21 device input field
22, 23, 24 first list
25 comment input field
26 second list
30 cursor
31 history information
101 display-screen-data editing apparatus
102 control unit
102a table generating unit
102b search processing unit
102c relevant information detecting unit
103 storing unit
104 communication I/F
105 input unit
106 display unit
107 display
201 variable table
202 history table
203 history-inclusive variable table

The invention claimed is:

1. A display-screen-data editing apparatus that generates screen data that operates and displays, on a programmable display, a value of a device included in the programmable display or an apparatus connected to the programmable display, comprising:

a memory configured to store therein a variable table that includes an item in which the device and a comment that is an annotation string for the device are associated with each other;

a processor configured to extract, from the screen data, the device used in the screen data, a comment for the device used in the screen data, and history information that indicates a usage condition of the device used in the screen data, generates a history table that includes a plurality of items, in each of which the device used in the screen data, the comment for the device used in the screen data, and the history information on the device used in the screen data are associated with each other and is further configured to generate a history-inclusive variable table by combining an item related to a device that is not used in the screen data being generated among items included in the variable table with the history table; and wherein the processor is further configured to search for an item in the history-inclusive variable table based on a character string input to one of a device input field and a comment input field and configured to control the display to display the extracted item as a first list, wherein, in response to receiving a selection of an item from among items in the first list, a device or a comment corresponding to the selected item is input to the device input field and the comment input field displayed on the display.

2. The display-screen-data editing apparatus according to claim 1, wherein when history information included in an item in the first list is selected by an operation of a user, the selected history information is input to the comment input field.

3. The display-screen-data editing apparatus according to claim 1, wherein in response to at least one from among a device and a comment of the extracted item being input to at least one from among the device input field and the comment input field, the processor extracts another item that includes a device or a comment relevant to the character string from the history-inclusive variable table and controls the display to display the item as a second list, and wherein, in response to at least one from among a device and a comment included in an item selected from the second list, the selected item is input to the device input field and the comment input field.

4. The display-screen-data editing apparatus according to claim 1, wherein the comment is assigned to the device to clarify intended use of the device and wherein the history information comprises type of the device and setting item of the device.

5. The display-screen-data editing apparatus according to claim 1, wherein at least one of the device and the comment is a primary key in the history-inclusive variable table.

6. The display-screen-date editing apparatus according to claim 1, wherein the variable table comprises a plurality of items, each of the plurality of items comprises a pair of the device and the comment, wherein the history table comprises the devices used in the screen data, the corresponding comment, and the corresponding history information with respect to the device, and wherein the history-inclusive variable table is generated by combining the variable table and the history table and by inserting at least one combination of the device and the comment not present in the history table from among a plurality of combinations of the device and the comment in the variable table with the history of said at least one combination being left blank.

7. The display-screen-data editing apparatus according to claim 1, wherein history information for the item not used in the screen data is left blank.

8. The display-screen-data editing apparatus according to claim 1, wherein the history table further includes an item without a comment, the item without the comment including the device used in the screen data and the associated history information indicating usage condition of the device used in the screen data, and wherein the processor is configured to:

extract from the history-inclusive variable table the item without the comment when the character string is input to the comment input field and matches partially the historical information of the item without the comment; and control the display to display in the first list the item without the comment.

* * * * *